(12) United States Patent
Sadhu et al.

(10) Patent No.: US 10,852,402 B2
(45) Date of Patent: Dec. 1, 2020

(54) PHASE ANTI-ALIASING USING SPREAD-SPECTRUM TECHNIQUES IN AN OPTICAL DISTANCE MEASUREMENT SYSTEM

(71) Applicant: TEXAS INSTRUMENTS INCORPORATED, Dallas, TX (US)

(72) Inventors: Subhash Chandra Venkata Sadhu, Bengaluru (IN); Bharath Patil, Bengaluru (IN); Jaiganesh Balakrishnan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 424 days.

(21) Appl. No.: 15/834,178

(22) Filed: Dec. 7, 2017

(65) Prior Publication Data
US 2019/0178993 A1   Jun. 13, 2019

(51) Int. Cl.
| | |
|---|---|
| *G01S 7/4865* | (2020.01) |
| *G01S 17/89* | (2020.01) |
| *G01S 7/484* | (2006.01) |
| *G01S 7/486* | (2020.01) |
| *G01S 17/10* | (2020.01) |
| *G01S 7/4911* | (2020.01) |
| *G01S 17/34* | (2020.01) |

(52) U.S. Cl.
CPC ............ *G01S 7/4865* (2013.01); *G01S 7/484* (2013.01); *G01S 7/4868* (2013.01); *G01S 7/4911* (2013.01); *G01S 17/10* (2013.01); *G01S 17/34* (2020.01); *G01S 17/89* (2013.01)

(58) Field of Classification Search
None
See application file for complete search history.

(56) References Cited

U.S. PATENT DOCUMENTS

| | | | | |
|---|---|---|---|---|
| 7,202,941 B2* | 4/2007 | Munro | ................... | G01S 7/483 356/4.1 |
| 8,587,771 B2* | 11/2013 | Xu | ........................... | G01S 7/497 356/4.02 |
| 9,921,311 B2* | 3/2018 | Van Der Tempel | .... | G01S 17/10 |
| 10,191,154 B2* | 1/2019 | Kadambi | ................ | G01S 17/34 |
| 10,234,560 B2* | 3/2019 | Van Der Tempel | .... | G01S 17/10 |

(Continued)

*Primary Examiner* — Isam A Alsomiri
*Assistant Examiner* — Amir J Askarian
(74) *Attorney, Agent, or Firm* — John R. Pessetto; Charles A. Brill; Frank D. Cimino

(57) ABSTRACT

A three dimensional time of flight (TOF) camera includes a transmitter and a receiver. The transmitter is configured to generate an electrical transmit signal at a plurality of frequencies over an integration time period and generate a transmit optical waveform corresponding with the electrical transmit signal. The receiver is configured to receive a reflected optical waveform that is the transmit optical waveform reflected off of an object, integrate the reflected optical waveform over the integration time period, and determine a distance to the target object based on a TOF of the optical waveform. The integration time period includes exposure time periods. A length of each of the exposure time periods corresponds to one of the frequencies. The TOF is determined based on a correlation of the electrical transmit signal and the return optical waveform utilizing a correlation function with respect to the integration time period.

10 Claims, 5 Drawing Sheets

(56) References Cited

U.S. PATENT DOCUMENTS

| | | | |
|---|---|---|---|
| 10,557,925 B2* | 2/2020 | Wang | G01S 17/894 |
| 2012/0213531 A1* | 8/2012 | Nazarathy | H03M 1/145 |
| | | | 398/202 |
| 2014/0313376 A1* | 10/2014 | Van Nieuwenhove | |
| | | | G01S 17/894 |
| | | | 348/241 |
| 2015/0304534 A1* | 10/2015 | Kadambi | G01S 7/4815 |
| | | | 348/207.11 |
| 2015/0331092 A1* | 11/2015 | Galera | G01S 17/10 |
| | | | 356/5.01 |
| 2017/0234985 A1* | 8/2017 | Kadambi | G01S 17/10 |
| | | | 702/152 |
| 2018/0059224 A1* | 3/2018 | Wang | G01S 7/4868 |
| 2018/0081041 A1* | 3/2018 | Niclass | G01S 7/4863 |
| 2019/0018138 A1* | 1/2019 | Warke | G01S 17/26 |
| 2019/0072651 A1* | 3/2019 | Halmos | G01S 7/4808 |

* cited by examiner

PHASE ANTI-ALIASING USING SPREAD-SPECTRUM TECHNIQUES IN AN OPTICAL DISTANCE MEASUREMENT SYSTEM

BACKGROUND

Optical time of flight (TOF) systems generally use optical light signals to measure distances to objects based on the time of flight of the light signal to the target object and back to the system. For example, three-dimensional (3D) TOF camera systems work by measuring the distance to a target object by reflecting light off of one or more targets and analyzing the reflected light. More specifically, 3D TOF camera systems typically determine a time of flight (TOF) for the light pulse to travel from the light source (e.g., a laser or light emitting diode (LED)) to a target object and return by analyzing the phase shift between the reflected light signal and the transmitted light signal. The distance to the target object then may be determined. An entire scene is captured with each transmitted light pulse. These systems may be used in many applications including: geography, geology, geomorphology, seismology, transport, human-machine interfaces, machine vision, and remote sensing. For example, in transportation, automobiles may include 3D TOF camera systems to monitor the distance between the vehicle and other objects (e.g., another vehicle). The vehicle may utilize the distance determined by the 3D TOF camera system to, for example, determine whether the other object, such as another vehicle, is too close, and automatically apply braking.

SUMMARY

In accordance with at least one embodiment of the disclosure, a three dimensional (3D) TOF camera includes a transmitter and a receiver. The transmitter is configured to generate an electrical transmit signal at a plurality of frequencies over an integration time period and generate a transmit optical waveform corresponding with the electrical transmit signal. The receiver is configured to receive a reflected optical waveform that is the transmit optical waveform reflected off of an object, integrate the reflected optical waveform over the integration time period, and determine a distance to the target object based on a TOF of the transmit optical waveform from the transmitter to the target object and back to the receiver as the reflected optical waveform. The integration time period includes a plurality of exposure time periods. A length of each of the plurality of exposure time periods corresponds to one of the plurality of frequencies. The TOF is determined based on a correlation of the electrical transmit signal and the return optical waveform utilizing a correlation function with respect to the integration time period.

Another illustrative embodiment is a transmitter for an optical distance measuring system. The transmitter includes a signal generator, a light source, and an illumination driver coupled to the signal generator and the light source. The signal generator is configured to generate an electrical transmit signal at a plurality of frequencies over an integration time period. Each of the plurality of frequencies corresponds with a length of one of a plurality of exposure time periods of a receiver. The light source is configured to generate a transmit optical waveform corresponding with the electrical transmit signal. The illumination driver is configured to drive the light source.

Yet another illustrative embodiment is a method of determining a distance to an object. The method includes receiving, by a receiver, a reflected optical waveform that is a transmitted optical waveform reflected off of a target object. The method also includes integrating the reflected optical waveform over an integration time period. The integration time period includes a plurality of exposure time periods. A length of each of the plurality of exposure time periods corresponds to one of a plurality of frequencies of the transmitted optical waveform. The method also includes determining a distance to the target object based on a TOF of the transmitted optical waveform from a transmitter to the target object and back to the receiver as the reflected optical waveform. The TOF is determined based on a correlation of an electrical transmit signal and the return optical waveform utilizing a correlation function with respect to the integration time period.

BRIEF DESCRIPTION OF THE DRAWINGS

For a detailed description of various examples, reference will now be made to the accompanying drawings in which.

NOTATION AND NOMENCLATURE

Figure 1:
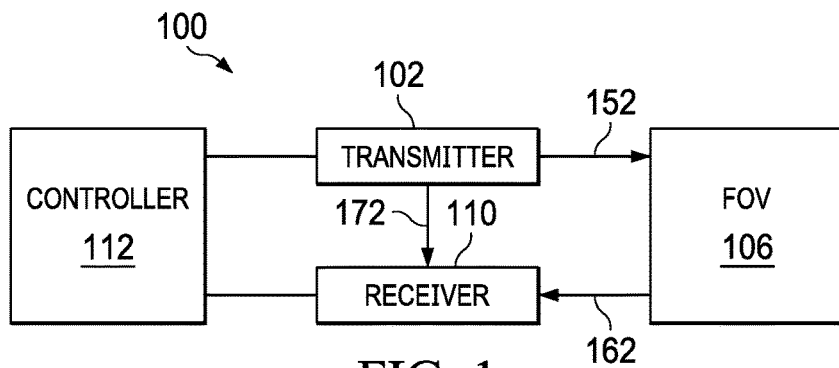
FIG. 1 shows an illustrative block diagram of an optical time of flight system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical TOF systems, such as 3D TOF cameras, point Light Detection and Ranging (LiDAR, LIDAR, lidar, LADAR), and scanning LIDAR, determine distances to various target objects utilizing the TOF of an optical signal (e.g., a light signal) to the target object and its reflection off a target object back to the TOF system (return signal). These systems can be used in many applications including: geography, geology, geomorphology, seismology, transport, and remote sensing. For example, in transportation, automobiles can include 3D cameras to monitor the distance between the vehicle and other objects (e.g., another vehicle). The vehicle can utilize the distance determined by the 3D camera to, for example, determine whether the other object, such as another vehicle, is too close, and automatically apply braking.

In many 3D TOF cameras, the TOF is determined based on a correlation between the phase of the return signal and the transmit signal. More particularly, a correlation function is utilized to convert the correlation between the phase of the return signal and the transmit signal into a time delay between the transmit signal and the return signal. The time delay is converted into a distance. However, objects at periodic distances (e.g., 3 m, 6 m, 9 m, etc.) will result in a return signal with the same phase. Therefore, the distance determination is ambiguous. For example, if a 50 MHz transmit signal is utilized, the time period of the optical wave is 20 ns. In 20 ns, light travels approximately 6 m. Therefore, an object at a distance of 3 m and an object at 6 m will both return a phase of $2\pi$. If a phase of $2\pi$ is detected for the return signal, the distance to the object could be 3 m or 6 m (or n x 3 m).

To account for distance ambiguity, many conventional systems rely on the fact that the power in the return signal naturally reduces by $1/r^2$ where r is the distance to the object. Thus, objects that are further than the desired operating distance of the camera will generate return signals that may be filtered out based on the power of the return signal (e.g., below the noise floor). Thus, the system can unambiguously make a distance determination. However, certain objects, such as retro-reflectors have a very high reflectivity. Therefore, natural attenuation is not sufficient to reject signals reflecting off such high reflectivity objects. To account for such high reflectivity objects, conventional systems increase the unambiguous range of the system.

For example, some conventional systems reduce the modulation frequency of the transmit signal. This increases the time period of the signal, thus, increasing the unambiguous range of the system (e.g., increase the unambiguous range from 6 m to 12 m). However, phase sensitivity and distance determination precision are reduced. Some conventional systems transmit at multiple frequencies to increase the unambiguous range (e.g., de-aliasing). For example, two transmit signals may be transmitted, one at 50 MHz and one at 60 MHz. The same object then may be measured using both signals. By looking at the phase value of both signals, the unambiguous range is increased to the lowest common multiple (LCM) of both signals. However, such systems require extra receiver processing. Furthermore, the disambiguation is highly susceptible to noise. The recovery of noise susceptibility requires a high power penalty. Yet other conventional systems use custom on/off sequences of transmissions to increase the unambiguous range. However, such systems require expensive distance computation and reduces the signal-to-noise ratio for a given bandwidth. Therefore, it is desirable to develop a system that can unambiguously determine the range to an object for a desired distance even in the presence of highly reflective objects.

In accordance with various examples, an optical TOF system is provided that causes the return signal's correlation magnitude to reduce to a relatively small value (e.g., approximately 0) beyond the desired range of the system (e.g., 5 m). The return correlation function's shape depends on the transmitted spectrum of the transmitted signal. By transmitting a signal which has a frequency domain characteristic that approximates a sinc function (or any other symmetric function), the signal, when converted to the time domain will resemble a box or a square wave. In other words, by transmitting a signal which has a spectrum approximating a sinc function, and/or a $since$ function, where n is a real number, will cause the correlation function to resemble a box/square wave function because the frequency domain characteristic resembles a sinc function. In such a system, the power of the return signal reduces faster than by natural attenuation, distance precision performance is not traded off, and the complexity of the distance calculation is not increased.

FIG. 1 shows an illustrative optical TOF system 100 in accordance with various examples. In some embodiments, the optical TOF system 100 is a 3D TOF camera. However, the optical TOF system 100 can be any type of optical TOF system (e.g., point LIDAR, scanning LIDAR, etc.). The optical TOF system 100 includes a transmitter 102, receiver 110, and controller 112. The transmitter 102 is configured, by the controller 112, to generate one or more electrical transmit signals 172 that corresponds with one or more optical waveforms 152 also generated by the transmitter 102. The controller 112 can be implemented as a processor (e.g., a microcontroller, a general-purpose processor, etc.) that executes instructions retrieved from a storage device, or as dedicated hardware circuitry.

In some embodiments, the electrical transmit signal 172, and thus, the optical waveform 152 is a single tone (e.g., a continuous wave). In other embodiments, the electrical transmit signal 172, and thus, the optical waveform 152 is a series of discrete signals. In some embodiments, the electrical transmit signal 172, and thus, the optical waveform 152 is amplitude modulated (e.g., a continuous amplitude modulated waveform). Furthermore, in some embodiments, the transmitter 102 generates the electrical transmit signal 172, and thus, the optical waveform 152 across many frequencies. For example, the transmitter 102 can begin by generating the electrical transmit signal 172 at a first frequency and then, either continuously or as discrete steps, increase the frequency. In some embodiments, the frequency of the electrical transmit signal 172 is increased around a center frequency (e.g., a frequency that corresponds with the desired (e.g., designed) distance objects within a field of view (FOV) 106 are to be measured). In some embodiments, the number of frequencies that the electrical transmit signal 172 is generated (e.g., the number of discrete step frequencies) is an even number, therefore, there may be two equal frequencies that make up the center frequency around which the frequency of the electrical transmit signal 172 is generated.

The transmitter 102 is also configured, in an embodiment, to direct the optical waveform 152 toward the FOV 106. In some embodiments, the transmitter 102 directs the optical waveform 152 toward the FOV 106 by directing the optical waveform 152 directly to the FOV 106. In other embodiments, the transmitter 102 directs the optical waveform 152 toward the FOV 106 by directing the optical waveform to a beam steering device (not shown) which then directs the optical waveform 152 to the FOV 106. In such embodiments, the beam steering device receives the optical waveform 152 from the transmitter 102 and steers the optical waveform 152 to the FOV 106. Thus, the transmitter 102 can direct the optical waveform 152 directly to the target object or can direct the optical waveforms 152 to a beam steering device which directs the optical waveform 152 to the FOV 106.

The optical waveform 152 (or optical waveforms 152) reflects off of any objects located within the FOV 106 (i.e., target objects) and returns toward the receiver 110 as reflected optical waveform 162. The reflected optical waveform 162 is then received by the receiver 110. In some embodiments, an additional beam steering device (not shown) steers the reflected optical waveform 162 to the receiver 110. In some embodiments, the receiver 110 receives the reflected optical waveform 162 directly from the target object.

The receiver 110 is configured to receive the reflected optical waveform 162 and determine the distance to the target objects within FOV 106 based on the TOF from the transmitter 102 to the target object and back to the receiver 110. For example, the speed of light is known, so the distance to the target objects is determined and/or estimated using the TOF. That is, the distance is estimated as $$d = \frac{c * TOF}{2}$$

where d is the distance to the target object, c is the speed of light, and TOF is the time of flight. The speed of light times the TOF is halved to account for the travel of the light pulse to, and from, the target object.

In some embodiments, the receiver 110, in addition to receiving the reflected optical waveform 162 reflected off of the target object, is also configured to receive the electrical transmit signal 172, or a portion of the electrical transmit signal 172, directly from the transmitter 102. The receiver 110, in an embodiment, is configured to convert the optical signal into an electrical signal, a received signal corresponding to the reflected optical waveform 162. The electrical transmit signal 172 received directly from the transmitter 102 acts as a reference signal. The receiver 110 then, in an embodiment, performs a correlation function using the reference signal (i.e., the electrical transmit signal 172) and the received signal. A peak in the correlation function corresponds to the time delay of the received reflected optical waveform 162 (i.e., the TOF). The correlation function in an embodiment is defined by $C(T)=\int_0^T f(t+\Delta t_i) r(t)dt$ where, T is the time across which the receiver receives the reflected optical waveform 162 (the integration time period), $f(t+\Delta t_i)$ corresponds with the electrical transmit signal 172, and r(t) corresponds with the received signal. The distance then can be estimated using the formula discussed above.

In other embodiments, a fast Fourier transform (FFT) can be performed on the received signal. A phase of the tone then is used to estimate the delay (i.e., TOF) in the received signal. The distance then can be estimated using the formula discussed above. In yet other embodiments, the in-phase (I) component is determined by correlating the received reflected optical waveform 162 with the electrical transmit signal 172 received directly from the transmitter 102, and the quadrature (Q) component is determined by correlating the received reflected optical waveform 162 with a 90 degree phase shifted version of the electrical transmit signal 172 received directly from the transmitter 102. The I/Q integrated charges are used to estimate the phase shift between the electrical transmit signal 172 received directly from the transmitter 102 and the received reflected optical waveform 162. The distance then can be estimated using the formula discussed above.

Figure 2:
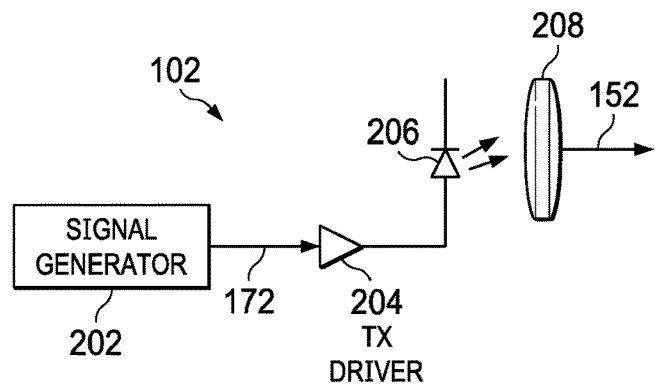
FIG. 2 shows an illustrative block diagram of a transmitter for an optical time of flight system in accordance with various examples.

FIG. 2 shows an illustrative transmitter 102 for optical TOF system 100 in accordance with various examples. The transmitter 102, in an embodiment, includes a signal generator 202, an illumination driver 204, a light source 206, and an optics device 208. The signal generator 202 is configured to generate the electrical transmit signal 172, which as discussed above can be a continuously changing frequency waveform (e.g., a waveform whose frequency changes continuously over the integration time period) or discrete frequency step waveforms (e.g., a waveform whose frequency changes in discrete frequency steps over the integration time period).

The illumination driver 204 generates a driving signal (regulates the current) to drive one or more optical transmitters, such as light source 206, so that the optical transmitter generates optical transmission signal 152 that corresponds with the electrical transmit signal 172 generated by the signal generator 202. In other words, the electrical transmit signal 172 modulates the intensity of the light transmitted by light source 206 during the pulse with the illumination driver 204 providing the driving current to the light source 206. While light source 206 is shown in FIG. 2 as a laser diode, any type of optical signal generator (e.g., a light emitting diode (LED)) can be utilized to generate the optical waveform 152. The optical device 208, which, in an embodiment is one or more lenses, is configured to direct (e.g., focus) the optical waveform 152 (e.g., the modulated light signal) toward the FOV 106.

Figure 3A:
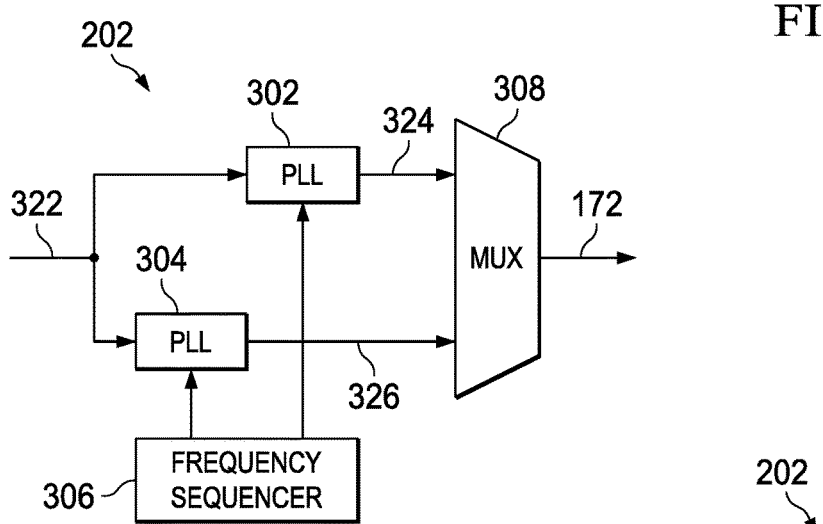
FIG. 3A shows an illustrative block diagram of a signal generator of a transmitter for an optical time of flight system in accordance with various examples.
Figure 4:
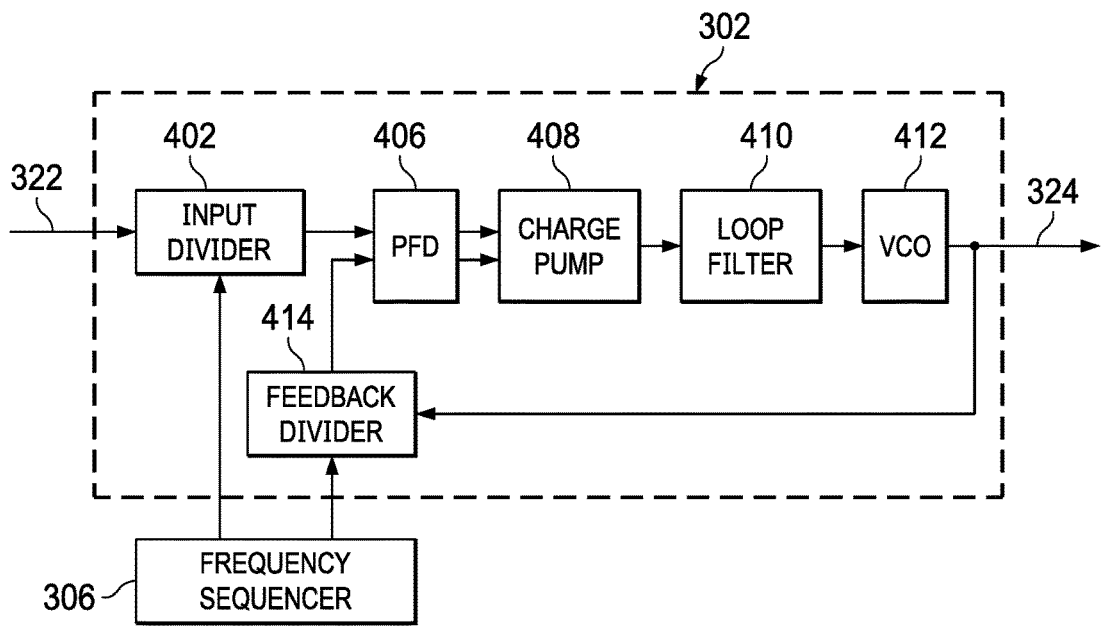
FIG. 4 shows an illustrative block diagram of a phased-lock loop (PLL) of a signal generator in accordance with various examples.

FIG. 3A shows an illustrative block diagram of signal generator 202 of transmitter 102 for optical time of flight system 100 in accordance with various examples. The signal generator 202 includes, in an embodiment, phased-lock loops (PLLs) 302-304, frequency sequencer 306, and multiplexer 308. PLL 302 generates an output signal 324 having a frequency that is a changeable multiple of the frequency of the input signal 322 (e.g., generated by a crystal oscillator). FIG. 4 shows an illustrative block diagram of PLL 302 in accordance with various examples. The PLL 302 includes, in an embodiment, an input divider 402, a phase/frequency detector (PFD) 406, a charge pump 408, a loop filter 410, a voltage controlled oscillator (VCO) 412, and a feedback divider 414. The input signal 322, in an embodiment, is divided by input divider 402 to generate a PLL reference signal. The input divider 402 may include, in some embodiments, a dual-modulus divider, binary counters, or other circuitry that allows division of the input signal frequency by a programmable divisor coefficient which is controllable by the frequency sequencer 306. In alternative embodiments, the input signal 322 is provided directly, without division to the PFD 406 as the reference signal.

VCO 412 is, in an embodiment, an electronic oscillator configured to control oscillation frequency by a voltage input. Thus, the frequency of oscillation created is varied by the applied voltage. Therefore, the VCO 412 generates the output signal 324 based on a control voltage provided by the loop filter 410. While shown internal to PLL 302 in FIG. 4, VCO 412 can be, in an embodiment, external to the remaining components of the PLL 302 (e.g., VCO 412 can be on a separate chip than the other components of PLL 302). Because the divisor coefficient is changeable and controllable, the frequency of the reference signal (e.g., the frequency of the reference signal can be different at different times), the VCO 412 can generate an output signal 324 that varies as a function of time.

The output frequency of the VCO 412 is reduced by the feedback divider 414 and compared, by the PFD 406, to the reference signal. The feedback divider 414 includes, in some embodiments, a dual-modulus divider, binary counters, or other circuitry that allows division of the output signal frequency of the VCO 412 by a programmable divisor coefficient. The PFD 406 identifies differences in the phase and/or frequency of the output of the feedback divider 414 and the reference signal and generates signals that control the charge pump 408 responsive to the identified differences in phase and/or frequency. The charge pump 408 generates currents to charge and discharge one or more capacitors in the loop filter 410. The voltage across each of the capacitors form the control voltage applied to the VCO 412 for a given period of time. For example, if the PFD 406 determines that the reference frequency has a frequency that is greater than the frequency output by the feedback divider 414, the PFD 406 outputs signals that cause the charge pump 408 to drive a current into the loop filter 410, thereby, increasing the voltage across one of the capacitors and increasing the output frequency of the VCO 412, and thus, the output signal 324.

The frequency sequencer 306 determines and sets the frequency scaling coefficients applied by the PLL 302. The frequency sequencer 306 can be implemented as a processor (e.g., a microcontroller, a general-purpose processor, etc.) that executes instructions retrieved from a storage device, or as dedicated hardware circuitry. In some embodiments, the frequency sequencer 306 is implemented in or is a part of controller 112. The frequency sequencer 306 can compute the coefficients for the input divider 402 and/or feedback divider 414 based on a selected output frequency, can retrieve pre-computed coefficients from a table, etc. In other words, the division values of the input divider 402 and/or the feedback divider 414 are programmable and/or changeable by the frequency sequencer 306. Hence, the division values of the input divider 402 and/or the feedback divider 414 can vary as a function of time. This variation in the division values leads to variation in the frequency of the output signal 324 as a function of time.

Returning to FIG. 3A, the PLL 304 can operate in the same manner as described above as PLL 302. Additionally, in some embodiments, the PLL 302 and/or PLL 304 is a fractional PLL. However, the PLL 304 is controlled by frequency sequencer 306 to generate output signal 326 to have a different frequency than the frequency of output signal 324. For example, the frequency sequencer 306 controls the PLL 302 to generate an output signal 324 at 50 MHz while controlling the PLL 304 to generate an output signal 326 at 50.5 MHz. The multiplexer 308 receives both output signals 324 and 326 and selects one of them to generate at least a portion of the electrical transmit signal 172. After a set amount of time elapses, the multiplexer 308 selects the other of the output signals 324 or 326 to generate at least a portion of the electrical transmit signal 172. This process continues back and forth with the multiplexer 308 alternately selecting the output signals 324-326.

Once the multiplexer 308 selects one of the outputs signals, the frequency sequencer changes the frequency scaling coefficients for the PLL corresponding with the other output signal. For example, if the output signal 324 is selected by multiplexer 308, the frequency sequencer 306 changes the frequency scaling coefficients for PLL 304, thus changing the frequency of output signal 326 which then settles at the new frequency. After the set amount of time elapses, the multiplexer 308 selects output signal 326, which has settled at the new frequency, and the frequency sequencer 306 changes the frequency scaling coefficients for PLL 302, thus changing the frequency of output signal 324 which then settles at the new frequency. In this way, the signal generator 202 can generate an electrical transmit signal 172 that composed of multiple discrete electrical signals, each of which are at different frequencies. Furthermore, using two PLLs allows the non-selected output signal to settle at the new frequency before being selected by the multiplexer. However, in alternative embodiments, only a single PLL can be utilized.

Figure 3B:
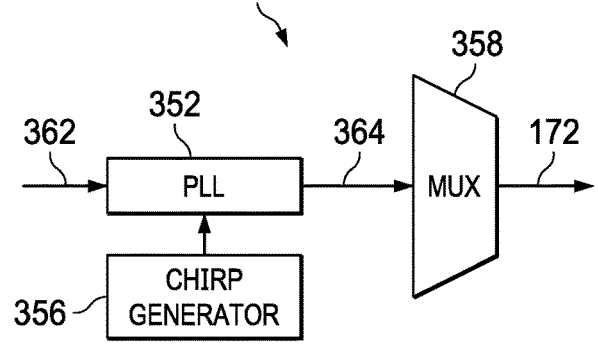
FIG. 3B shows an illustrative block diagram of a signal generator of a transmitter for an optical time of flight system in accordance with various examples.

FIG. 3B shows an illustrative block diagram of signal generator 202 of transmitter 102 for optical time of flight system 100 in accordance with various examples. The signal generator 202 of FIG. 3B, in an embodiment, includes PLL 352, chirp generator 356, and multiplexer 358. The PLL 352 is similar to and operates in a manner similar to PLLs 302 and 304 from FIG. 3A. However, unlike the frequency sequencer 306, the chirp generator 356 is configured, in an embodiment, to change the scaling coefficients for PLL 352 continuously, thus generating a continuously varying frequency analog output signal 364 from input signal 362. In some embodiments, the PLL 352 generates multiple output signals (not shown) which correspond with phase shifted output signals used corresponding with the I and Q components as discussed above. The multiplexer 358 selects one of these outputs as at least a portion of the electrical transmit signal 172.

Figure 5:
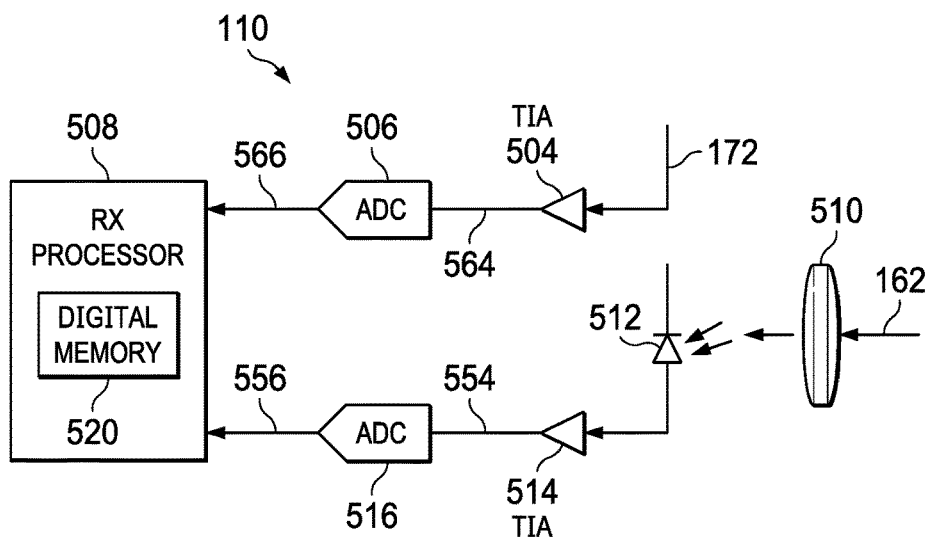
FIG. 5 shows an illustrative block diagram of a receiver for an optical time of flight system in accordance with various examples.

FIG. 5 shows an illustrative block diagram of receiver 110 for optical time of flight system 100 in accordance with various examples. The receiver 110 includes, in an embodiment, an optics device 510 (e.g., a lens), a photodetector 512, two trans-impedance amplifiers (TIAs) 504 and 514, two analog-to-digital converters (ADCs) 506 and 516, and a receiver processor 508. As discussed above, in an embodiment, the reflected optical waveform 162 is received by the receiver 110 after reflecting off of target objects within the FOV 106. The optics device 510, in an embodiment, receives the reflected optical waveform 162. The optics device 510 directs (e.g., focuses) the reflected optical waveform 162 to the photodetector 512. The photodetector 512 is configured to receive the reflected optical waveform 162 and convert the reflected optical waveform 162 into a current received signal 552 (a current that is proportional to the intensity of the received reflected light). TIA 514 is configured to receive the current received signal 552 and convert the current received signal 552 into a voltage signal, designated as voltage received signal 554 that corresponds with the current received signal 552. ADC 516 is configured to receive the voltage received signal 554 and convert the voltage received signal 554 from an analog signal into a corresponding digital signal, designated as digital received signal 556. Additionally, in some embodiments, the current received signal 552 is filtered (e.g., band pass filtered) prior to being received by the TIA 514 and/or the voltage received signal 554 is filtered prior to being received by the ADC 516. In some embodiments, the voltage received signal 554 is received by a time to digital converter (TDC) (not shown) to provide a digital representation of the time that the voltage received signal 554 is received.

TIA 504, in an embodiment, receives the electrical transmit signal 172 as a current signal and is configured to convert the electrical transmit signal 172 into a voltage signal, designated as voltage reference signal 564. ADC 506 is configured to receive the voltage reference signal 564 and convert the voltage reference signal 564 from an analog signal into a corresponding digital signal, designated as digital reference signal 566. In some embodiments, the ADC 506 directly receives the electrical transmit signal 172 from the transmitter 102 as a voltage signal and converts the electrical transmit signal 172 from an analog signal into the corresponding digital reference signal 566. Additionally, in some embodiments, the electrical transmit signal 172 is filtered (e.g., band pass filtered) prior to being received by the TIA 504 and/or the ADC 506. In some embodiments, the voltage reference signal 564 and/or electrical transmit signal 172 is received by a TDC (not shown) to provide a digital representation of the time that the voltage reference signal 564 and/or electrical transmit signal 172 is received.

The processor 508 is any type of processor, controller, microcontroller, and/or microprocessor with an architecture optimized for processing the digital received signal 556 and/or the digital reference signal 566. For example, the processor 508 can be a digital signal processor (DSP), a central processing unit (CPU), a reduced instruction set computing (RISC) core such as an advanced RISC machine (ARM) core, a mixed signal processor (MSP), etc. In some embodiments, the processor 508 is a part of the controller 112. The processor 508, in an embodiment, acts to demodulate the digital received signal 556 and the digital reference signal 566. The processor 508 then determines, in an embodiment, the distance to target objects within the FOV 106 by, as discussed above, performing a correlation function using the reference signal and the received signal. A peak in the correlation function corresponds to the time delay of each received reflected optical waveform 162 (i.e., the TOF). The distance to the target object within the FOV 106 can be estimated using the formula discussed above.

In some embodiments, the entire frequency spectrum is not captured in a single exposure time for the optical TOF 100 (e.g., a TOF camera). Therefore, in some embodiments, a first part (e.g., 50%) of the electrical transmit signal 172 and corresponding optical waveform 152 is transmitted during the exposure time of the camera. In such embodiments, a digital memory 520 which while shown as internal to receiver processor 508 can be, in some embodiments, external to receiver processor 508, stores the digital received signal 556 and the digital reference signal 566 for the first part of the signal. The second part (e.g., remaining 50%) of the electrical transmit signal 172 and corresponding optical waveform 152 is then transmitted. The digital received signal 556 for the second part is combined with the digital reference signal 566 for the first part and the digital reference signal 566 for the second part is combined with the digital reference signal 566 for the first part, and the receiver processor 508 determines the distance to the target object within the FOV 106 as discussed above based on the entire signal. In other words, in some embodiments, the transmit signals and receive signals can be broken up into multiple parts.

Figure 6:
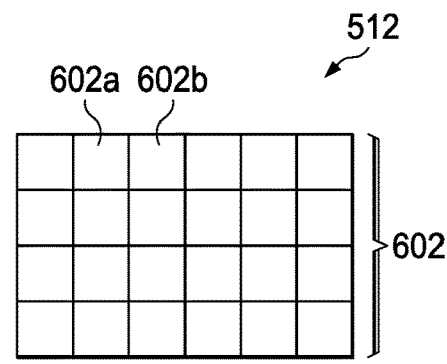
FIG. 6 shows an illustrative photodetector of a receiver for an optical time of flight system in accordance with various examples.

FIG. 6 shows an illustrative photodetector 512 of receiver 110 in accordance with various examples. In an embodiment, the photodetector 512 includes an array of photodiode elements 602 (e.g., photodiode elements 602a and 602b). For a given photodetector 512, each of the photodiode elements 602 can be a PiN photodiode, an APD, a SPAD, and/or a SiPM. Thus, each photodiode element 602 can be a single photodiode or an array of photodiodes (e.g., a SiPM). Hence, the array of photodiode elements 602 may include additional arrays of photodiodes.

As discussed above, the reflected optical waveform 162 is received by the photodetector 312. Each of the photodiode elements 602 is exposed to the scene for a finite amount of time (i.e., the integration time period). Thus, processor 508 integrates the reflected optical waveform 162 (as voltage received signal 564) over the integration time period. Hence, voltage received signal 564 represents the reflected optical waveform 162 throughout the integration time period. Due to the integration, transmitting for a longer period of time during a single integration time period at a single frequency equates to transmitting at higher power at that frequency. In an embodiment, the integration time period includes a plurality of exposure time periods. Each of the exposure time periods equates to the time that the optical waveform 152 is transmitted at a single frequency. For example, the time period that the optical waveform 152 is transmitted at 50 MHz corresponds with one exposure time period, while the time period that the optical waveform 152 is transmitted at 50.5 MHz corresponds with a second exposure time period. Thus, the length of each of the exposure time periods corresponds to one of the frequencies of the transmitted optical waveform 152. The exposure time period that corresponds with the center frequency may be termed the center exposure time period. In other words, the time period that the optical waveform 152 is transmitted at the center frequency is, in an embodiment, the center exposure time period.

Figure 7A:
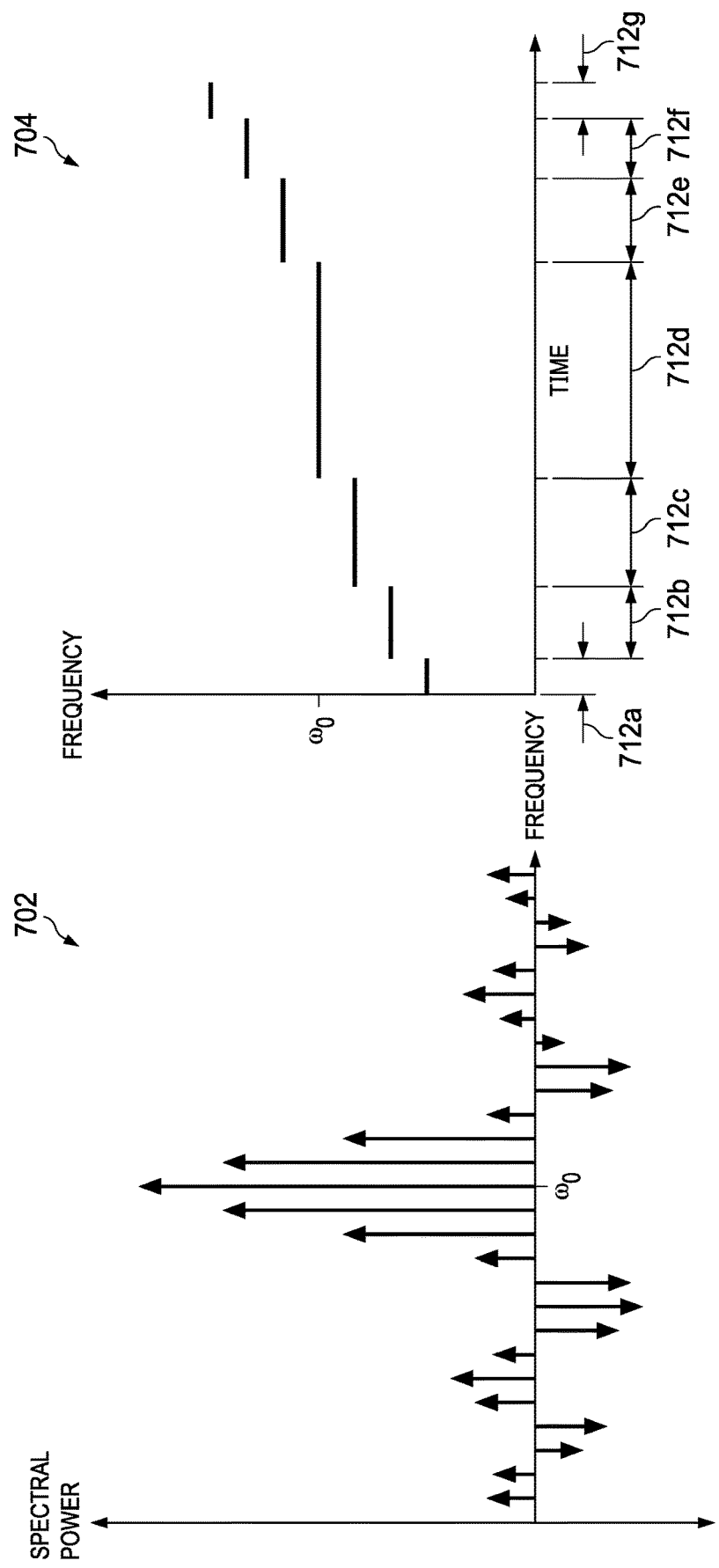
FIG. 7A shows an illustrative spectral power versus frequency graph and a frequency versus time graph for an electrical transmit signal in accordance with various examples.

FIG. 7A shows an illustrative spectral power versus frequency graph 702 and a frequency versus time graph 704 for electrical transmit signal 172, and thus, optical waveform 152 in accordance with various examples. The example graphs 702 and 704 show discrete electrical signals, and thus, may correspond, in an embodiment, to the signal generator shown in FIG. 3A. One way to reduce ambiguity due to objects being located at periodic distances is to ensure that the correlation magnitude between the reflected optical waveform 162 and the electrical transmit signal 172 reduces to a relatively small value beyond the desired distance of interest. For example, if the desired distance to measure objects within FOV 106 is 5 m, then ensuring that the correlation magnitude between the reflected optical waveform 162 signal and the electrical transmit signal 172 reduces to approximately 0 after 5 m will reduce ambiguity because objects located at further distances will have no correlation. The correlation function's shape (e.g., a square shape that reduces to approximately 0 at a straight edge) depends on the transmitted spectrum. By transmitting the optical waveform 152 in the frequency domain through the integration time period in a shape that approximates the sinc function (or other symmetric function), the correlation function's magnitude will resemble a square shape that reduces to approximately 0 at a straight edge at the desired distance. As discussed above, the center frequency (shown as $\omega_0$) corresponds with the desired distance objects with the FOV 106 are to be measured (e.g., 50 MHz for 3 m). As shown in graph 702, as the transmitter increases and decreases spectral power by, as discussed above and shown in graph 704, increasing and decreasing the exposure time period 712a-g (the transmission time) at specific frequencies. As shown in the example of FIG. 7A, the exposure time period 712d at the center frequency (the center exposure time period) is the longest, while the exposure time period at lower and higher frequencies (e.g., exposure time periods 712a and 712g) than the center frequency is less. In this way, the transmitted optical waveform 152 which becomes the reflected optical waveform 162 creates a correlation magnitude when correlated with the electrical transmit signal 172 that drops to approximately 0 beyond the desired distance. Thus, the measured distance is unambiguous. In other embodiments, the exposure time period of the center frequency may be less than the surrounding exposure time periods as long as equidistant frequencies to the center frequency have the same integration time period.

As discussed above, in some embodiments, the spectrum spread is sampled into n equally spaced discrete frequencies. Each of these frequencies has its own finite exposure time. As the exposure time is finite, the spectrum for each frequency can spread (even if just a little). To ensure that this spectral spreading does not interfere with other frequencies (e.g., to make each signal orthogonal), in some embodiments the exposure time per frequency may be constrained by: $t=n\Delta f$, where t is the exposure time of a particular frequency, n is an integer, and $\Delta f$ is the frequency step.

Figure 7B:
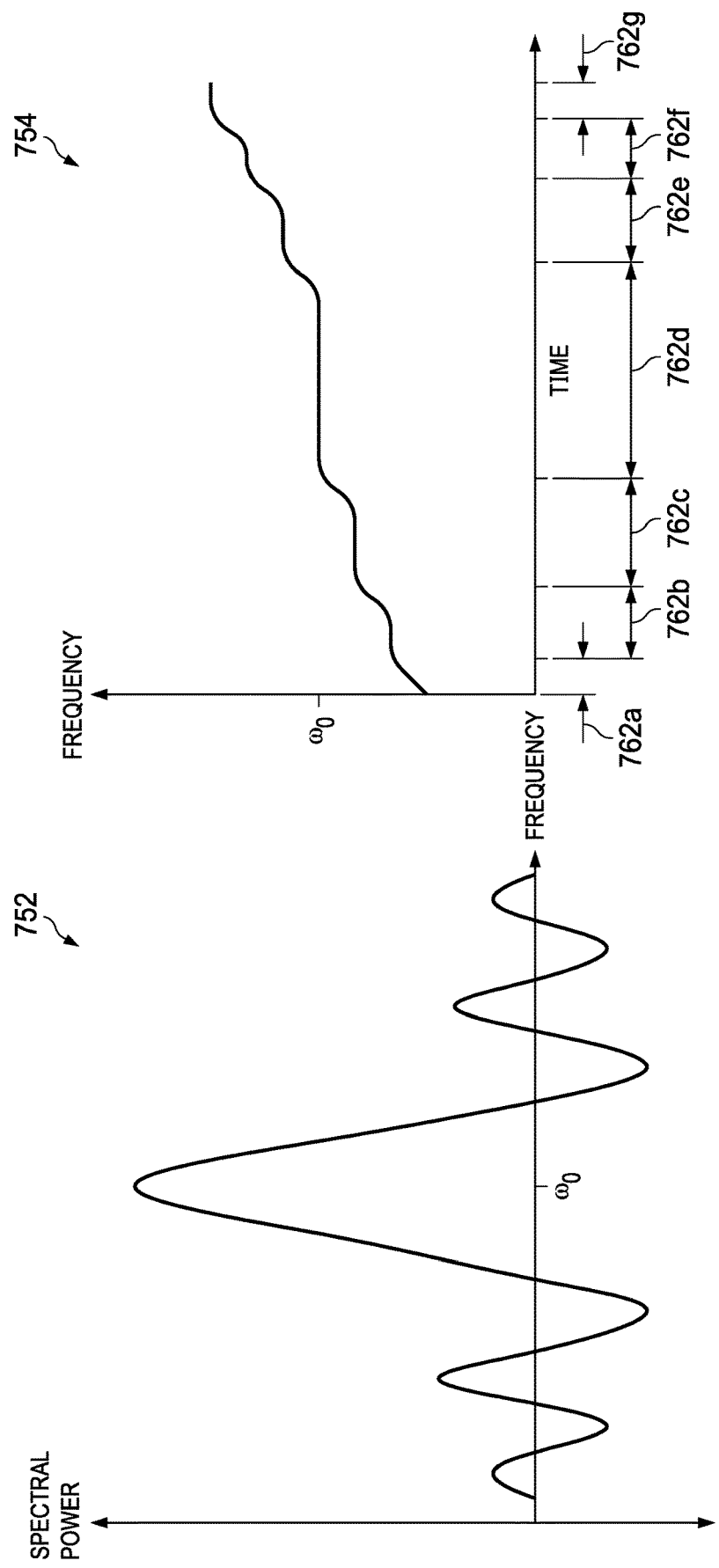
FIG. 7B shows an illustrative spectral power versus frequency graph and a frequency versus time graph for an electrical transmit signal in accordance with various examples.

FIG. 7B shows an illustrative spectral power versus frequency graph 752 and a frequency versus time graph 754 for electrical transmit signal 172 in accordance with various examples. The example graphs 752 and 754 show a continuously changing frequency electrical signal, and thus, may correspond, in an embodiment, to the signal generator shown in FIG. 3B. FIG. 7B is similar to FIG. 7A except that the electrical transmit signal 172 is continuously changing frequency, even if at a very small amount during each of the exposure time periods 762a-g. As shown in graph 752, as the transmitter increases and decreases spectral power by, as discussed above and shown in graph 754, increasing and decreasing the exposure time period 762a-g (the transmission time) at specific frequencies. As shown in the example of FIG. 7B, the exposure time period 762d at the center frequency (the center exposure time period) is the longest, while the exposure time period at lower and higher frequencies (e.g., exposure time periods 762a and 762g) than the center frequency is less. In this way, the transmitted optical waveform 152 which becomes the reflected optical waveform 162 creates a correlation magnitude when correlated with the electrical transmit signal 172 that drops to approximately 0 beyond the desired distance. Thus, the measured distance is unambiguous.

Figure 8:
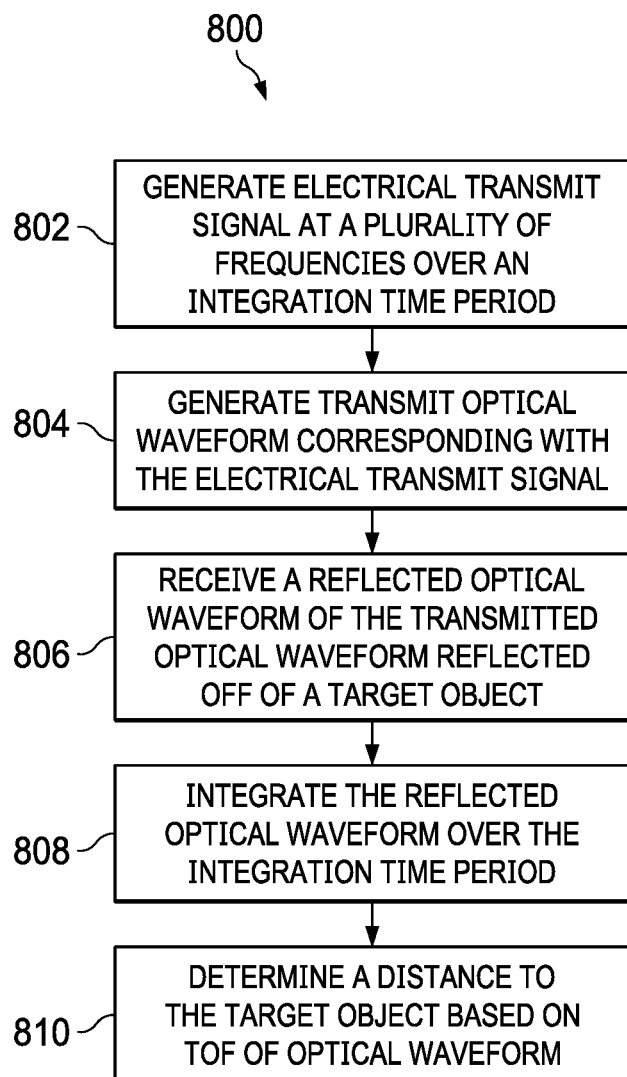
FIG. 8 shows an illustrative flow diagram of a method of determining a distance to an object in accordance with various examples.

FIG. 8 shows an illustrative flow diagram of a method 800 of determining a distance to an object in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, are performed by the transmitter 102 (including the signal generator 202, illumination driver 204, light source 206 and/or the optics device 208), the receiver 110 (including the optics device 510, photodetector 512, TIAs 504 and/or 514, ADCs 506 and/or 516, and/or processor 508), and/or the controller 112 and implemented in logic and/or by a processor executing instructions stored in a non-transitory computer readable storage medium.

The method 800 begins in block 802 with generating an electrical transmit signal at a plurality of frequencies over an integration time period. For example, the transmitter 102, and more particularly, the signal generator 202 can generate the electrical transmit signal 172. The electrical transmit signal is generated at multiple frequencies, either in discrete steps or continuously changing, around, in an example, a center frequency.

In block 804, the method 800 continues with generating a transmit optical waveform corresponding with the electrical transmit signal. For example, the transmitter 102, and more particularly, the light source 206 can generate the optical waveform 152 from the electrical transmit signal 172, in some cases, via a drive current generated by illumination driver 204. The method 800 continues in block 806 with receiving a reflected optical waveform of the transmitted optical waveform reflected off of a target object. For example, the transmit optical waveform can be directed to a FOV (such as FOV 106) where it reflects off of an object and returns toward the system as reflected optical waveform 162. The receiver 110, and more particularly, the photodetector 512 can receive the reflected optical waveform 162.

In block 808, the method 800 continues with integrating the reflected optical waveform over the integration time period. For example, the receiver 110 can integrate the reflected optical waveform 162 over the integration time period. The integration time period can include a plurality of exposure time periods. A length of each of the exposure time periods can correspond with one of the frequencies of the transmitted optical waveform. For example, the exposure time period of the center frequency can be longer than the exposure time period of other frequencies. In some embodiments, the spectral power of the transmit optical waveform during the integration time period approximates a sinc function (or other symmetric function). Therefore, the exposure time periods of the various frequencies are correspondingly timed (e.g., higher spectral power frequencies (e.g., the center frequency) have longer exposure time periods than lower spectral power frequencies).

The method 800 continues in block 810 with determining a distance to the target object based on a TOF of the transmit optical waveform from the transmitter and back to the receiver as the reflected optical waveform. For example, the TOF can be determined by the processor 508 utilizing a correlation function with respect to the integration time period.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A three dimensional (3D) time of flight (TOF) camera, comprising:
 a transmitter configured to:
  generate an electrical transmit signal at a plurality of frequencies over an integration time period; and
  generate a transmit optical waveform corresponding with the electrical transmit signal; and
 a receiver configured to:

receive a reflected optical waveform that is the transmit optical waveform reflected off of a target object;

integrate the reflected optical waveform over the integration time period, the integration time period including a plurality of exposure time periods, a length of each of the plurality of exposure time periods depending on one of the plurality of frequencies; and determine a distance to the target object based on a TOF of the transmit optical waveform from the transmitter to the target object and back to the receiver as the reflected optical waveform, the TOF determined based on a correlation of the electrical transmit signal and the reflected optical waveform utilizing a correlation function with respect to the integration time period;

wherein the plurality of frequencies includes a center frequency that corresponds with a desired distance objects are to be measured, a first frequency which is less than the center frequency, and a second frequency which is greater than the center frequency.

2. The 3D TOF camera of claim 1, wherein the plurality of exposure time periods includes a first exposure time period depending on the first frequency, a second exposure time period depending on corresponding to the second frequency, and a center exposure time period depending on the center frequency.

3. The 3D TOF camera of claim 2, wherein the center exposure time period is greater than the first exposure time period and the second exposure time period.

4. The 3D TOF camera of claim 3, wherein each of the plurality of exposure time periods depends on spectral power of the transmit optical waveform at a point in time within the integration time period.

5. The 3D TOF camera of claim 4, wherein the spectral power of the transmit optical waveform during the integration time period approximates a sinc raised to an n power function, wherein n is a real number.

6. A transmitter for an optical distance measuring system, comprising:

a signal generator configured to generate an electrical transmit signal at a plurality of frequencies over an integration time period, each of the plurality of frequencies depending on a length of one of a plurality of exposure time periods of a receiver;

a light source configured to generate a transmit optical waveform corresponding with the electrical transmit signal; and an illumination driver coupled to the signal generator and the light source, the illumination driver configured to drive the light source;

wherein the signal generator includes a first phased-lock loop (PLL), a second PLL, a frequency sequencer, and a multiplexer;

wherein, during a first of the plurality of exposure time periods:

the first PLL is configured to generate a first discrete electrical signal of the electrical transmit signal at a first frequency in the plurality of frequencies;

the second PLL is configured to generate a second discrete electrical signal of the electrical transmit signal at a second frequency in the plurality of frequencies; and the multiplexer is configured to select the first discrete signal to drive the light source.

7. The transmitter of claim 6, wherein, during a second of the plurality of exposure time periods:

the first PLL is configured to generate a third discrete electrical signal of the electrical transmit signal at a third frequency in the plurality of frequencies;

the second PLL is configured to generate the second discrete electrical signal at the second frequency; and the multiplexer is configured to select the second discrete signal to drive the light source.

8. The transmitter of claim 7, wherein the frequency sequencer generates a first signal that causes the first PLL to generate the first discrete electrical signal at the first frequency during the first of the plurality of exposure time periods, a second signal that causes the second PLL to generate the second discrete electrical signal at the second frequency during the first and second of the plurality of exposure time periods, and a third signal that causes the first PLL to generate the third discrete electrical signal at the third frequency during the second of the plurality of exposure time periods.

9. A method of determining a distance to an object, comprising:

receiving, by a receiver, a reflected optical waveform that is a transmitted optical waveform reflected off of a target object;

integrating the reflected optical waveform over an integration time period, the integration time period including a plurality of exposure time periods, a length of each of the plurality of exposure time periods depending on one of a plurality of frequencies of the transmitted optical waveform; and determining a distance to the target object based on a time of flight (TOF) of the transmitted optical waveform from a transmitter to the target object and back to the receiver as the reflected optical waveform, the TOF determined based on a correlation of an electrical transmit signal and the return optical waveform utilizing a correlation function with respect to the integration time period;

wherein each of the plurality of exposure time periods depends on spectral power of the transmit optical waveform at a point in time within the integration time period.

10. The method of claim 9, wherein the spectral power of the transmit optical waveform during the integration time period approximates a sinc function.

* * * * *